Feb. 9, 1932.   G. W. HODDY ET AL   1,844,122
MOTOR AND DRIVE CONNECTION
Filed Aug. 2, 1930
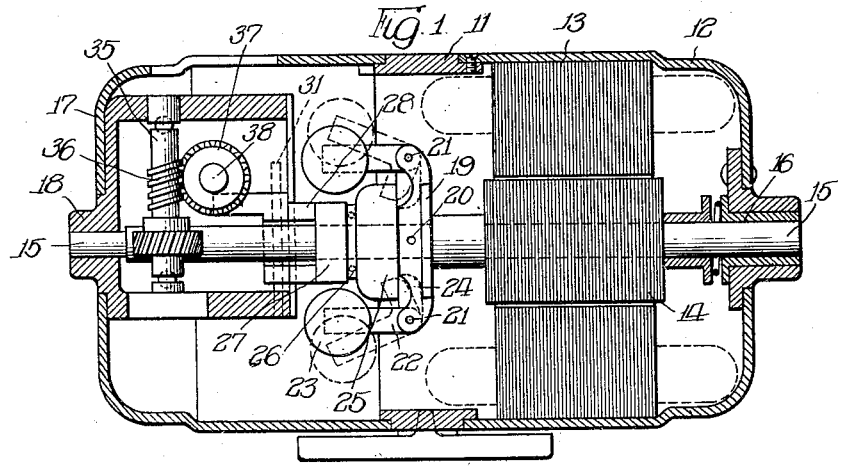
Inventors:
George W. Hoddy,
Leo Deutsch,
By Wilkinson Huxley Byron & Knight
attys.

Patented Feb. 9, 1932

1,844,122

UNITED STATES PATENT OFFICE

GEORGE W. HODDY AND LEO DEUTSCH, OF SPRINGFIELD, OHIO, ASSIGNORS TO ROBBINS & MYERS, INC., OF SPRINGFIELD, OHIO, A CORPORATION OF OHIO

MOTOR AND DRIVE CONNECTION

Application filed August 2, 1930. Serial No. 472,623.

This invention relates to a new and improved motor and drive connection, and more particularly to such a drive and motor adapted for use in moving the tuning condensers or other tuning or control devices whereby remote control of such radio may be had.

The motor may be started and stopped by closing and opening the motor circuit at a point remote from the motor. The motor and drive connections will be located at the radio set and directly connected to the set which thus may be located at a point distant from the motor control switch.

The particular details of the motor and motor control circuit form no part of the present invention, but are disclosed in our copending application Serial No. 409,382, filed November 23, 1929.

It is an object of the present invention to provide a motor and motor drive connection adapted for use in operating the controls of a radio set or the like.

It is a further object of the invention to provide a connection for such motor drive adapted to maintain the motor normally disconnected from the set controls and to automatically connect the motor to the set when the motor reaches the desired operating speed.

It is also an object to provide a connection adapted to prevent injury to the radio set or the like by overrunning of the motor beyond the control limits of the set.

It is an additional object to provide a connection permitting set operation without absolute alignment of the drive with the set operating controls.

It is a further object to provide a control motor and connection adapted for use with existing types of radio sets without material alteration therein.

Other and further objects will appear as the description proceeds.

We have shown certain preferred embodiments of our invention in the accompanying drawings, in which—

Figure 1 is a longitudinal vertical section through the station selector motor and clutch control apparatus;

Figure 2 is a cross-section at right angles to Figure 1 through the gear box and clutch mechanism;

Figure 3 is a horizontal cross-section through the operating mechanism of Figure 1;

Figure 4 is a view of the clutch of Figure 2 as seen from the left; and

Figure 5 is a view of the motor and housing of Figure 1 as seen from the left.

In the drawings, the frame 11 carries the motor housing 12 which contains the motor field 13 and the motor rotor 14 secured to shaft 15. This shaft 15 has an end bearing 16 carried by the housing 12. The opposite side of the frame 11 carries the housing 17 which encloses the gear train and which is provided with a bearing at 18 supporting the opposite end of the motor shaft 15.

The yoke 19 is secured to the shaft 15 by a pin 20 which causes the yoke to rotate with the shaft. The yoke 19 has pivotally supported thereon at the points 21, the bell crank levers 22 carrying the weights 23. The short arms 24 of these bell crank levers engage a collar 25 which is slidably mounted on the shaft 15. Through the medium of a ball-bearing collar 26 the collar 25 thrusts against a sleeve 27 which is slidably fitted upon the shaft 15 and provided with the axially extending lugs 28 which are located above and below the shaft 15 and fit into recesses 29 formed in arms of the bell crank lever 30. The interfitting of the lugs 28 and recesses 29 prevents rotation of the collar 27.

The bell crank levers 30 are pivoted at 31 to a frame 32 supported in the housing member 17. The shaft 15 is formed with a worm gear 33 which meshes with a gear 34 carried by the vertical shaft 35. The shaft 35 is also formed with a gear 36 which meshes with a gear 37 carried on the horizontal shaft 38. This shaft 38 has an end bearing at 39 against the frame 32 and is fitted within a sleeve 40 which is carried in a bearing 41 formed in the frame 32. This sleeve 40 has a ring 42 fitted in a slot therein and a spring 43 is located upon the sleeve and which thrusts at one end against the bearing 41 and at the other end against the ring 42 so as to normally urge the sleeve to the right in Figure 2 or inwardly of the housing. This, in turn, through bell crank 30 and sleeve 27, causes the bell crank levers 22 to bring the weights in adjacent the shaft when the motor is idle.

The shaft 38 is provided with a pin 44 which fits in a slot in the sleeve 40 and causes that sleeve to rotate with the shaft. The arms 45 of the bell crank lever 30 engage the end of the sleeve 40 at points above and below the shaft 38. The outer end of the sleeve 40 carries the clutch disc 46 which is rigidly secured to the sleeve. This clutch disc 46 is provided with a counterbored or recessed portion 47 within which is located a shoulder 48 on the shaft 38. This shoulder acts as a retainer for a steel washer 49, which washer engages the end of a compression spring 50, the opposite end of which engages a collar 51 which is free to rotate on the shaft 38. This spring 50 tends to thrust the collar 51 to the left or towards the outer end of the shaft.

At the outer end of the shaft 38 are the adjusting nuts 52 which directly engage a washer 53 acting as a retainer for the ball thrust bearing 54. Adjacent this ball thrust bearing 54 is a disc 55 of insulating material which acts as one plate of a friction clutch. This disc 55 is free to rotate upon the shaft 38. A disc 56, rotatably fitted upon shaft 38, carries a facing 57 of suitable clutch material adapted to engage the disc 55. This disc 56 is normally thrust against the disc 55 by the collar 51 and spring 50 through the interposed thrust bearing 58. This provides a clutch unit which is free to revolve on the shaft 38.

The collar 59 is secured to the clutch disc 55 by means of the spring 60, the opposite ends of which are secured to the disc 55 by screws 61. The collar 59 is provided with a threaded opening 62 receiving a set screw to connect it to the shaft of a condenser or other radio control or tuning device which is rotatably operable. The spring 60 forms a flexible connection between this disc 55 and the tuning element within the radio, and obviates the necessity for absolute accuracy of alignment between the connection and radio shaft.

In the operation of our construction the motor control switch, which has not been shown, will be closed thus starting the motor. It will be understood that the motor is reversible and it may be started in either direction by suitable controls. The gears and control connections operate in the same manner regardless of the direction of rotation of the motor.

As the motor picks up speed, the bell crank levers 22 are swung outwardly by centrifugal force acting upon weights 23. The arms 24 thrust against collar 25 and sleeve 27 and its lugs 28 are thrust against the bell crank lever 30. Movement of this lever is resisted by the spring 43 and when the force applied by levers 22 and their weights 23 is sufficient to overcome the resistance of this spring, the clutch disc 46 is carried against the clutch disc 56. This disc 56 then drives the disc 55 and the radio control shaft is operated through spring 60 and collar 59.

When the desired tuning point is reached, the motor switch is opened to open the motor circuit and the motor stops. The motor is of a type adapted to stop without overrunning after the circuit is opened. Further, there is a great gear reduction between the motor and radio set shaft so that a slight overrun will have an extremely slight effect on the tuning shaft.

A further feature to minimize any possible overrun of the tuning shaft lies in the form of operating connection. As soon as the rotor shaft starts to slow up, the spring 43 overcomes the centrifugal force acting through the weights 23 on the bell crank levers 22, and this spring 43 thrusting against ring 42 moves the sleeve 40 to the right, drawing the clutch disc 46 out of contact with disc 56 and breaking the drive connection.

It is customary in radio tuning devices to provide stops which limit the angular movement or rotation of the devices. It is, therefore, necessary to provide means to prevent damage to the parts should the stops be engaged and the motor continue to run. This is accomplished in our construction by the friction discs 55 and 56. The disc 55 is positively connected to the radio control shaft and disc 56 is positively driven by clutch disc 46. The frictional engagement between discs 55 and 56 is limited to an amount which will not injure the parts and the stops. If the motor continues to run, the discs 46 and 56 will be driven, but there will be slippage between discs 56 and 55, and the latter disc will not move.

The disc 46 is disengaged from disc 56 when the motor is stopped. The discs 56 and 55 are both free to rotate on shaft 38. Consequently when the motor is not in operation the radio set may be tuned by hand without encountering any resistance from the power drive unit.

While we have shown certain preferred forms of our invention, these are to be understood as illustrative only, as we contemplate such changes and modifications as come within the spirit and scope of the appended claims.

We claim:

1. In a motor drive construction, a motor, a cross shaft driven by the motor, a clutch member rotatable on the cross shaft and adapted to be connected to a driven shaft, a clutch member rotatable with the cross shaft and carried by a sleeve slidably fitted on said shaft, a bell crank member engaging said sleeve to force the clutch members into engagement, and a spring carried by the sleeve for normally holding the clutch members out of engagement.

2. In a motor drive construction, a motor, a cross shaft driven by the motor, a clutch member rotatable on the cross shaft and adapted to be connected to a driven shaft, a clutch member rotatable with the cross shaft and carried by a sleeve slidably fitted on said shaft, a bell crank member engaging said sleeve to force the clutch members into engagement, a sleeve carried by the motor shaft engaging the bell crank, centrifugal members carried by the motor shaft adapted to thrust said sleeve against the bell crank, and a spring carried by the sleeve for normally holding the clutch members out of engagement.

3. In a motor drive construction, a shaft driven by the motor, a clutch member loosely fitted on said shaft, means to connect said clutch member to a driven device, a second clutch member loosely fitted on the shaft and adapted to make a yieldable connection to the first clutch member, and a third clutch member driven by the shaft and adapted to positively engage the second clutch member.

4. In a motor drive construction, a shaft driven by the motor, a clutch member loosely fitted on said shaft, means to connect said clutch member to a driven device, a second clutch member loosely fitted on the shaft and adapted to make a yieldable connection to the first clutch member, a third clutch member driven by the shaft and adapted to positively engage the second clutch member, means normally maintaining the third clutch member out of engagement with the second clutch member, and means to force the clutch members together upon a predetermined speed of rotation of the motor.

5. In a motor drive construction, a shaft driven by the motor, a clutch member loosely fitted on said shaft, means to connect said clutch member to a driven device, a second clutch member loosely fitted on the shaft and adapted to make a yieldable connection to the first clutch member, a third clutch member driven by the shaft and adapted to positively engage the second clutch member, a spring normally maintaining the third clutch member out of engagement with the second clutch member, a bell crank adapted to force the clutch members together against resistance of the spring, and centrifugal means rotated by the motor shaft to operate the bell crank upon a predetermined speed of rotation of the motor.

6. In a motor drive construction, a shaft driven by the motor, a clutch member loosely fitted on said shaft, means to connect said clutch member to a driven device, a second clutch member loosely fitted on the shaft and adapted to make a yieldable connection to the first clutch member, a third clutch member driven by the shaft and adapted to positively engage the second clutch member, a spring normally maintaining the third clutch member out of engagement with the second clutch member, a bell crank adapted to force the clutch members together against resistance of the spring, and centrifugal means rotated by the motor shaft to operate the bell crank upon a predetermined speed of rotation of the motor, said spring serving to break the clutch connection and restore the centrifugal means to normal position when the motor drops below a predetermined speed.

Signed at Chicago, Illinois, this 29th day of July, 1930.

GEO. W. HODDY.
LEO DEUTSCH.